United States Patent
Romano et al.

(10) Patent No.: US 12,420,919 B2
(45) Date of Patent: Sep. 23, 2025

(54) PYLON RESTRAINT SYSTEM

(71) Applicant: Textron Innovations Inc., Providence, RI (US)

(72) Inventors: Peter Quinn Romano, Fort Worth, TX (US); Jedediah Bryce Goodell, North Richland Hills, TX (US); Joshua Andrew Emrich, Grapevine, TX (US); Michael S. Seifert, Southlake, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 255 days.

(21) Appl. No.: 18/166,867

(22) Filed: Feb. 9, 2023

(65) Prior Publication Data

US 2023/0182893 A1    Jun. 15, 2023

Related U.S. Application Data

(62) Division of application No. 16/584,448, filed on Sep. 26, 2019, now Pat. No. 11,584,521.

(51) Int. Cl.
*B64C 27/12*    (2006.01)
*B64C 27/00*    (2006.01)

(52) U.S. Cl.
CPC ............ *B64C 27/12* (2013.01); *B64C 27/001* (2013.01); *B64C 2027/002* (2013.01)

(58) Field of Classification Search
CPC . B64C 27/12; B64C 27/001; B64C 2027/002; F16M 1/00
See application file for complete search history.

(56) References Cited

U.S. PATENT DOCUMENTS

| | | | | |
|---|---|---|---|---|
| 3,163,378 A | * | 12/1964 | Balke | B64C 27/001 244/17.27 |
| 3,698,663 A | * | 10/1972 | Balke | B64C 27/001 244/17.27 |
| 3,858,831 A | * | 1/1975 | Halwes | B64C 27/001 244/17.27 |
| 3,945,628 A | * | 3/1976 | Halwes | B64C 27/001 267/152 |
| 4,140,028 A | * | 2/1979 | Desjardins | F16F 7/10 74/574.3 |
| 4,362,281 A | * | 12/1982 | Cresap | B64C 27/001 248/556 |
| 4,365,771 A | * | 12/1982 | Halwes | B64C 27/001 244/17.27 |

(Continued)

FOREIGN PATENT DOCUMENTS

| | | |
|---|---|---|
| EP | 0718187 A1 | 6/1996 |
| EP | 2179922 A1 | 4/2010 |

(Continued)

*Primary Examiner* — Assres H Woldemaryam
(74) *Attorney, Agent, or Firm* — SLATER MATSIL, LLP

(57) ABSTRACT

In an embodiment, a rotorcraft includes an airframe; a main rotor transmission; one or more brackets mounting the main rotor transmission to the airframe, longitudinal axes of the one or more brackets being substantially parallel with a longitudinal axis of the rotorcraft; and one or more restraints mounting the main rotor transmission to the airframe, the one or more restraints being mounted at an angle non-orthogonal to the longitudinal axis of the rotorcraft and a lateral axis of the rotorcraft.

17 Claims, 10 Drawing Sheets

(56) References Cited

U.S. PATENT DOCUMENTS

| | | | | |
|---|---|---|---|---|
| 5,154,371 | A | * | 10/1992 | Grant .................... B64C 27/12 244/54 |
| 5,788,182 | A | * | 8/1998 | Guimbal ................ F16F 15/06 244/17.11 |
| 8,141,813 | B2 | | 3/2012 | Pancotti et al. |
| 2015/0136900 | A1 | | 5/2015 | Griffin et al. |
| 2015/0139575 | A1 | * | 5/2015 | Romano ............ F16C 11/0628 156/293 |
| 2015/0139800 | A1 | * | 5/2015 | Hendricks ............ B64C 27/001 416/134 A |
| 2018/0051765 | A1 | * | 2/2018 | Seifert ................. B64C 27/001 |
| 2019/0300162 | A1 | * | 10/2019 | Smith .................... F16F 13/24 |
| 2019/0329878 | A1 | * | 10/2019 | Haldeman ............... B64C 27/12 |
| 2021/0403148 | A1 | * | 12/2021 | Stamps .................. B64C 27/10 |

FOREIGN PATENT DOCUMENTS

| | | | | |
|---|---|---|---|---|
| EP | 3375710 A1 | * | 9/2018 | ........... B64C 27/001 |
| WO | WO-2012141676 A1 | * | 10/2012 | ........... B64C 27/001 |

* cited by examiner

PYLON RESTRAINT SYSTEM

CROSS-REFERENCE TO RELATED APPLICATIONS

This application is a divisional of, and claims the benefit of, U.S. application Ser. No. 16/584,448, filed on Sep. 26, 2019, which application is hereby incorporated herein by reference.

TECHNICAL FIELD

The present invention relates generally to a system for restraining movement and isolating a pylon in a rotorcraft, and, in particular embodiments, to a system including restraints which attach the pylon to an airframe of the rotorcraft and are disposed non-orthogonally with respect to the airframe.

BACKGROUND

A rotorcraft may include one or more rotor systems including one or more main rotor systems. The main rotor system generates aerodynamic lift to support the weight of the rotorcraft in flight and thrust to move the rotorcraft in forward flight. The main rotor system may generate noise, vibration, and energy, which may result in discomfort for passengers, wear to components of the rotorcraft, and the like. For smooth, quiet flight and increased longevity of rotorcraft components, a pylon restraint system may isolate the main rotor system from an airframe of the rotorcraft

SUMMARY

In accordance with an embodiment, a rotorcraft includes an airframe; a main rotor transmission; one or more brackets mounting the main rotor transmission to the airframe, longitudinal axes of the one or more brackets being substantially parallel with a longitudinal axis of the rotorcraft; and one or more restraints mounting the main rotor transmission to the airframe, the one or more restraints being mounted at an angle non-orthogonal to the longitudinal axis of the rotorcraft and a lateral axis of the rotorcraft. In an embodiment, the one or more restraints are mounted to the airframe at an angle from 32° to 40° to the lateral axis of the rotorcraft. In an embodiment, the one or more restraints have a stiffness from 6552 lbs/in to 8008 lbs/in. In an embodiment, each of the one or more brackets is attached to the airframe through a spherical bearing. In an embodiment, the one or more restraints have a total travel from ½ inch to 1 inch. In an embodiment, a height between a central axis of the one or more restraints and a bottom surface of the main rotor transmission is from 0.69 inches to 0.85 inches. In an embodiment, the one or more restraints provide a stiffness in a roll plane less than a stiffness in a pitch plane. In an embodiment, the one or more restraints include two restraints, and the one or more restraints provide stiffness in a roll plane and a pitch plane.

In accordance with another embodiment, a system includes a rotor hub; a plurality of rotor blades attached to the rotor hub; a transmission coupled to the rotor hub; and a transmission mounting assembly for mounting the transmission to an airframe, the transmission mounting assembly including one or more brackets; and one or more restraints, the one or more restraints being mounted to the transmission and the airframe at an angle between 0° and 90° with a lateral axis of the airframe. In an embodiment, the one or more restraints include one or more elastomeric restraints. In an embodiment, each restraint of the one or more restraints has a travel from ¼ inch to ½ inch in a direction parallel to a longitudinal axis of the airframe and a travel from ¼ inch to ½ inch in a direction parallel to the lateral axis of the airframe. In an embodiment, the angle is from 32° to 40°. In an embodiment, the transmission mounting assembly includes four brackets and two restraints. In an embodiment, a longitudinal axis of a first bracket and a longitudinal axis of a second bracket of the one or more brackets meet at a virtual focal point, and a first restraint of the one or more restraints is mounted to the transmission at a point from 10.2 inches to 12.5 inches below the virtual focal point.

In accordance with yet another embodiment, a method for determining parameters for a transmission restraint in a rotorcraft includes determining a plurality of inputs for a main rotor system, the main rotor system including a rotorcraft fuselage, a rotorcraft transmission, and a rotorcraft hub; solving equations of motion for the main rotor system to determine a spring rate for a restraint used to attach the rotorcraft transmission to the rotorcraft fuselage; calculating a distance between an attachment point of the restraint on the rotorcraft transmission and a virtual focal point of two brackets used to attach the rotorcraft transmission to the rotorcraft fuselage based on the spring rate; and calculating an angle of restraint between the restraint and the rotorcraft fuselage based on the spring rate and the distance, the angle of restraint being between 0° and 90°. In an embodiment, the spring rate is from 6552 lbs/in to 8008 lbs/in. In an embodiment, the distance is from 10.2 inches to 12.5 inches. In an embodiment, the angle of restraint is from 32° to 40°. In an embodiment, the plurality of inputs include a distance from a center of gravity of the hub to a center of gravity of the pylon, a distance from the center of gravity of the pylon to a center of gravity of the fuselage, a weight of the hub, a weight of the pylon, and a weight of the fuselage. In an embodiment, the restraint has a stiffness in a roll plane of the rotorcraft from 5367 lbs/in to 6559 lbs/in and a stiffness in a pitch plane of the rotorcraft from 3758 lbs/in to 4594 lbs/in.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
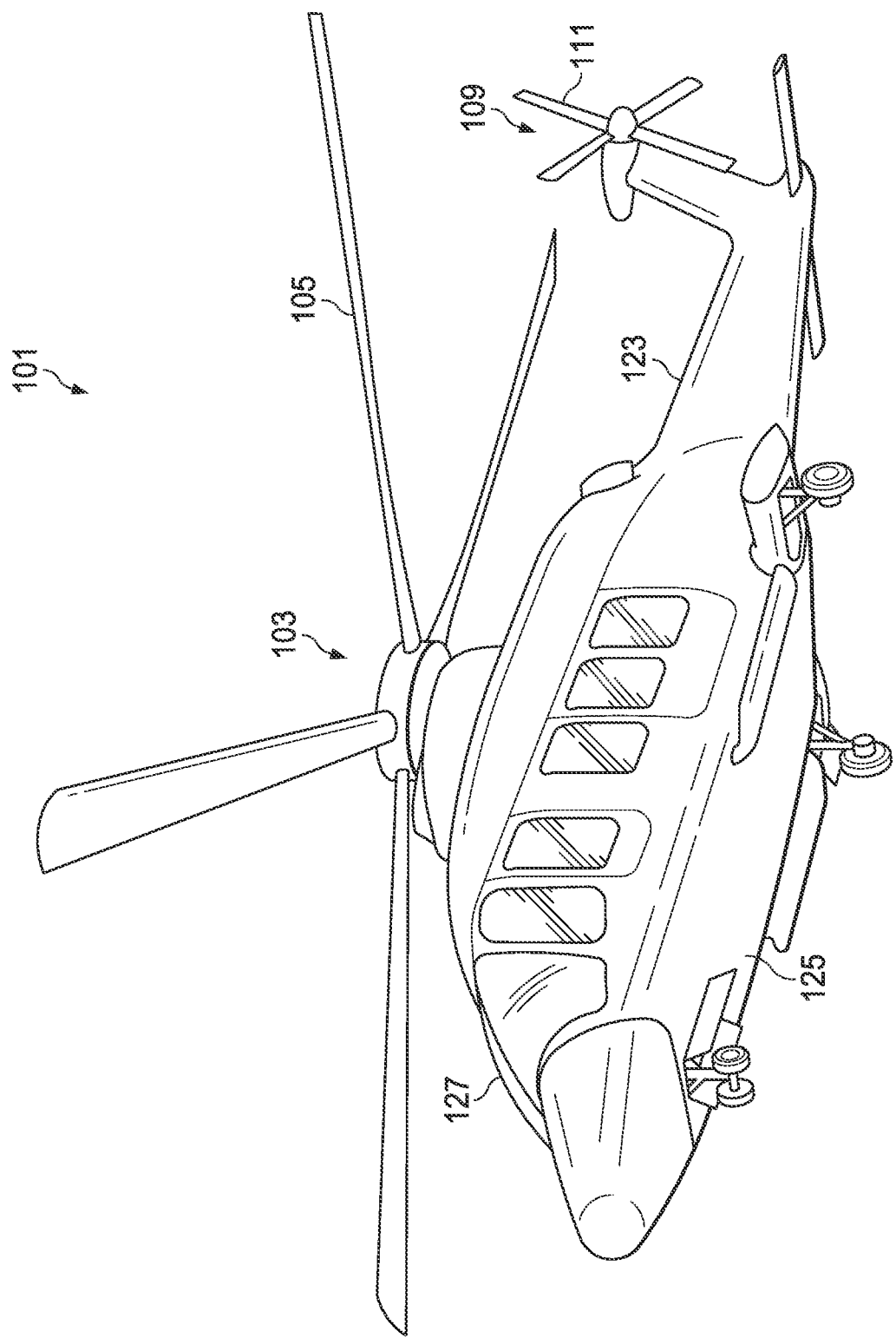
FIG. 1 illustrates a rotorcraft according to some embodiments.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate in order to selectively control the attitude, altitude and movement of the rotorcraft 101. The swashplate may be used to collectively and/or cyclically change the pitch of the main rotor blades 105. The rotorcraft 101 also has an anti-torque system, which may include a tail rotor 109, a no-tail-rotor (NOTAR), or a dual main rotor system. In the embodiment illustrated in FIG. 1, the rotorcraft 100 includes the tail rotor 109. The pitch of each tail rotor blade 111 in the tail rotor 109 may be collectively changed in order to vary thrust of the anti-torque system, providing directional control of the rotorcraft 101. The pitch of the tail rotor blades 111 is changed by one or more tail rotor actuators. In some embodiments, a fly-by-wire (FBW) system sends electrical signals to the tail rotor actuators or main rotor actuators to control the flight of the rotorcraft 101.

Power is supplied to the main rotor system 103 and the anti-torque system by engines. There may be one or more engines, which may be controlled according to signals from the FBW system. The output of the engines is provided to a driveshaft, which is mechanically and operatively coupled to the main rotor system 103 and the anti-torque system through a main rotor transmission (such as the main rotor transmission 205, discussed below in reference to FIG. 2) and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, the cockpit 127 is configured to accommodate a pilot and/or a co-pilot, as illustrated. It is also contemplated that rotorcraft 101 may be operated remotely. In embodiments in which the rotorcraft 101 may be operated remotely, the cockpit 127 could be configured as a fully functioning cockpit to accommodate a pilot and/or a co-pilot to provide for greater flexibility of use, or could be configured with a cockpit having limited functionality. For example, the cockpit could have accommodations for only one person who would function as the pilot or co-pilot with a remote operator functioning as a remote pilot, a remote co-pilot, or a back-up pilot. In yet other contemplated embodiments, the rotorcraft 101 could be configured as an unmanned vehicle, in which case the cockpit 127 could be eliminated entirely in order to save space and cost.

Figure 2:
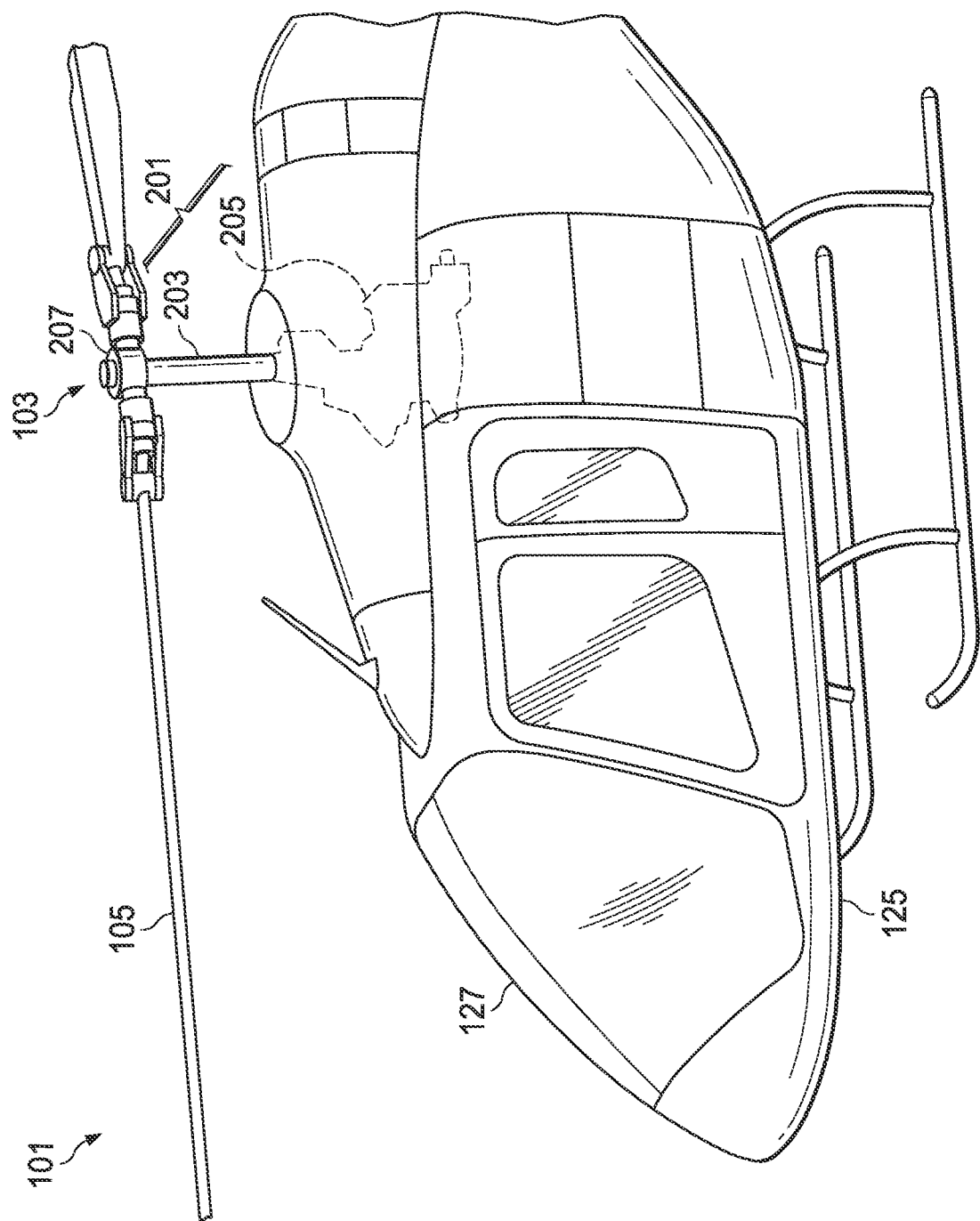
FIG. 2 illustrates a positioning of a main pylon within a rotorcraft according to some embodiments.

FIG. 2 illustrates a positioning of a main pylon 201 within the rotorcraft 101, in accordance with some embodiments. The main pylon 201 may be part of the main rotor system 103 and may include a mast 203 and a main rotor transmission 205. Power may be provided to the main rotor transmission 205 from the engines and transferred by the main rotor transmission 205 to the mast 203. The mast 203 may be attached to a main rotor hub 207, to which the main rotor blades 105 are also attached, and may be used to rotate the main rotor hub 207 and the main rotor blades 105. As illustrated in FIG. 2, the main pylon 201 may be positioned in an upper portion of the fuselage 125. As will be discussed in further detail below, the main pylon 201 may be attached to an airframe (such as the airframe 301, discussed below in reference to FIGS. 3A-3C) disposed within the fuselage 125.

Operation of the main rotor system 103 causes vibrations in the main pylon 201, which may be transferred to the fuselage 125 through the airframe 301. The vibrations may cause discomfort in passengers and pilots of the rotorcraft 101, as well as fatigue and damage in components of the rotorcraft 101. It is desirable to reduce any vibrations transferred from the main pylon 201 to the airframe 301 and the fuselage 125 in order to increase passenger comfort as well as rotorcraft component longevity.

Figure 3A:
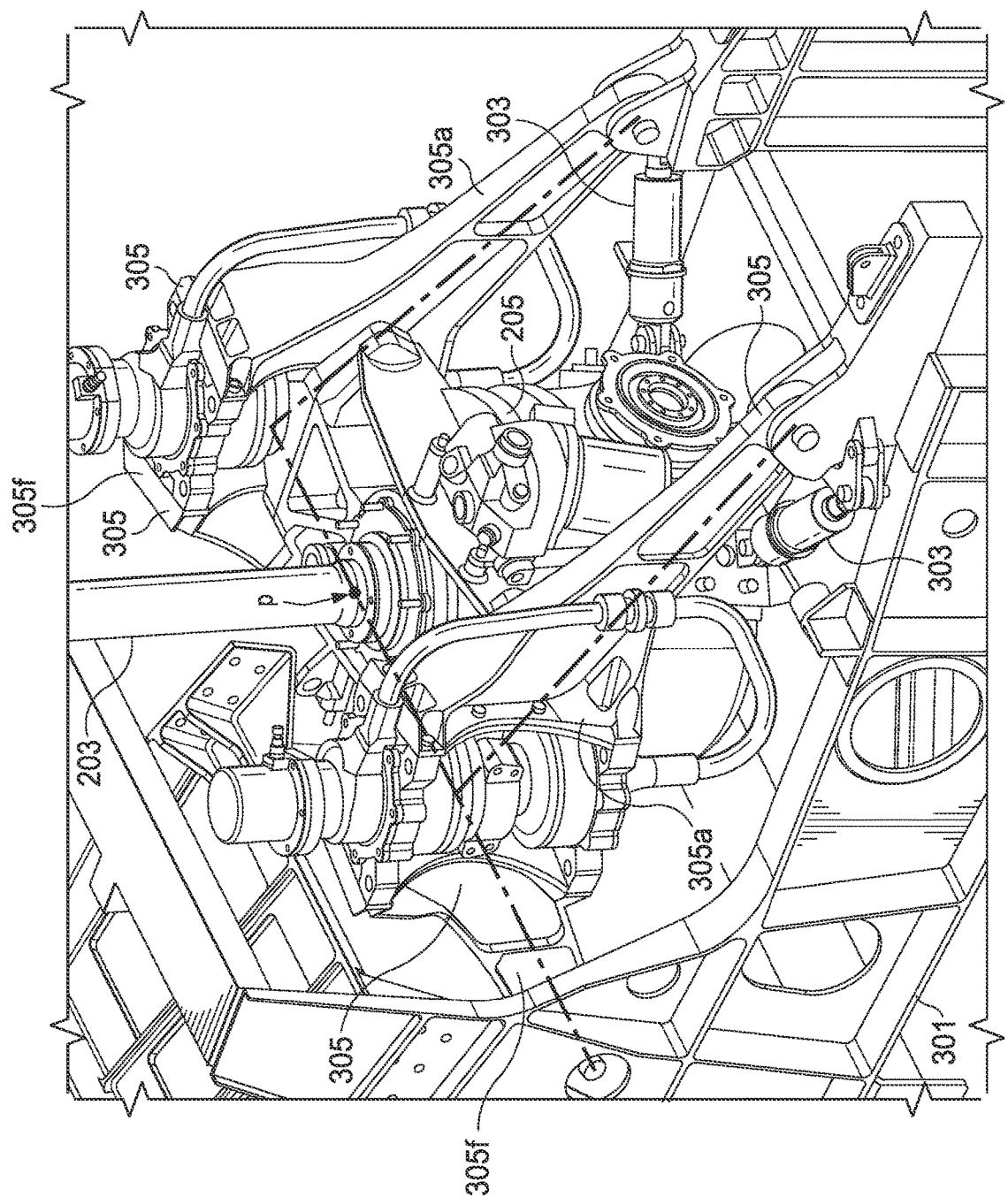
FIGS. 3A-3C illustrate an isometric view, a side view, and a bottom-up view, respectively, of a mounting of a main rotor transmission to an airframe according to some embodiments.
Figure 3B:
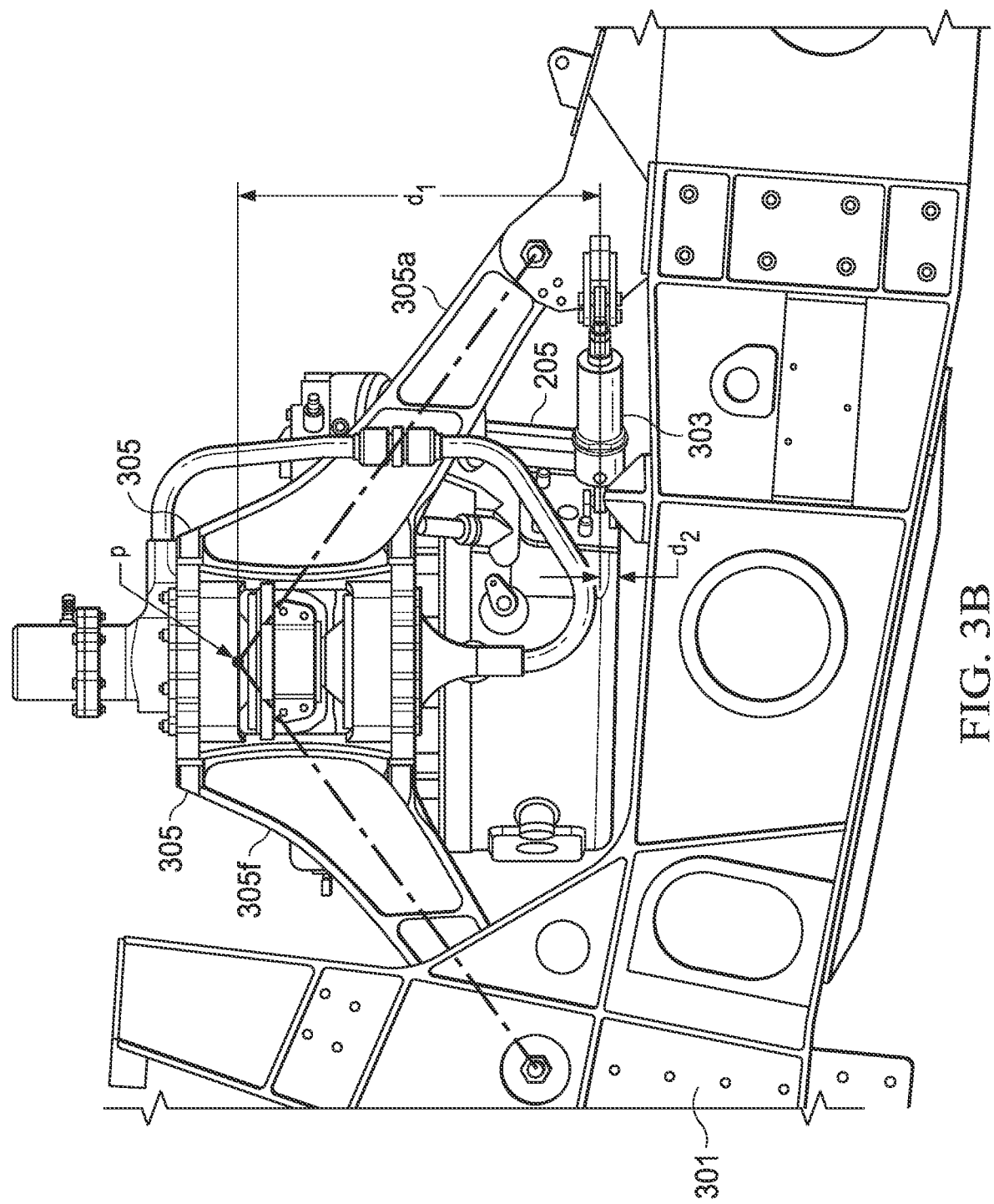
Figure 3C:
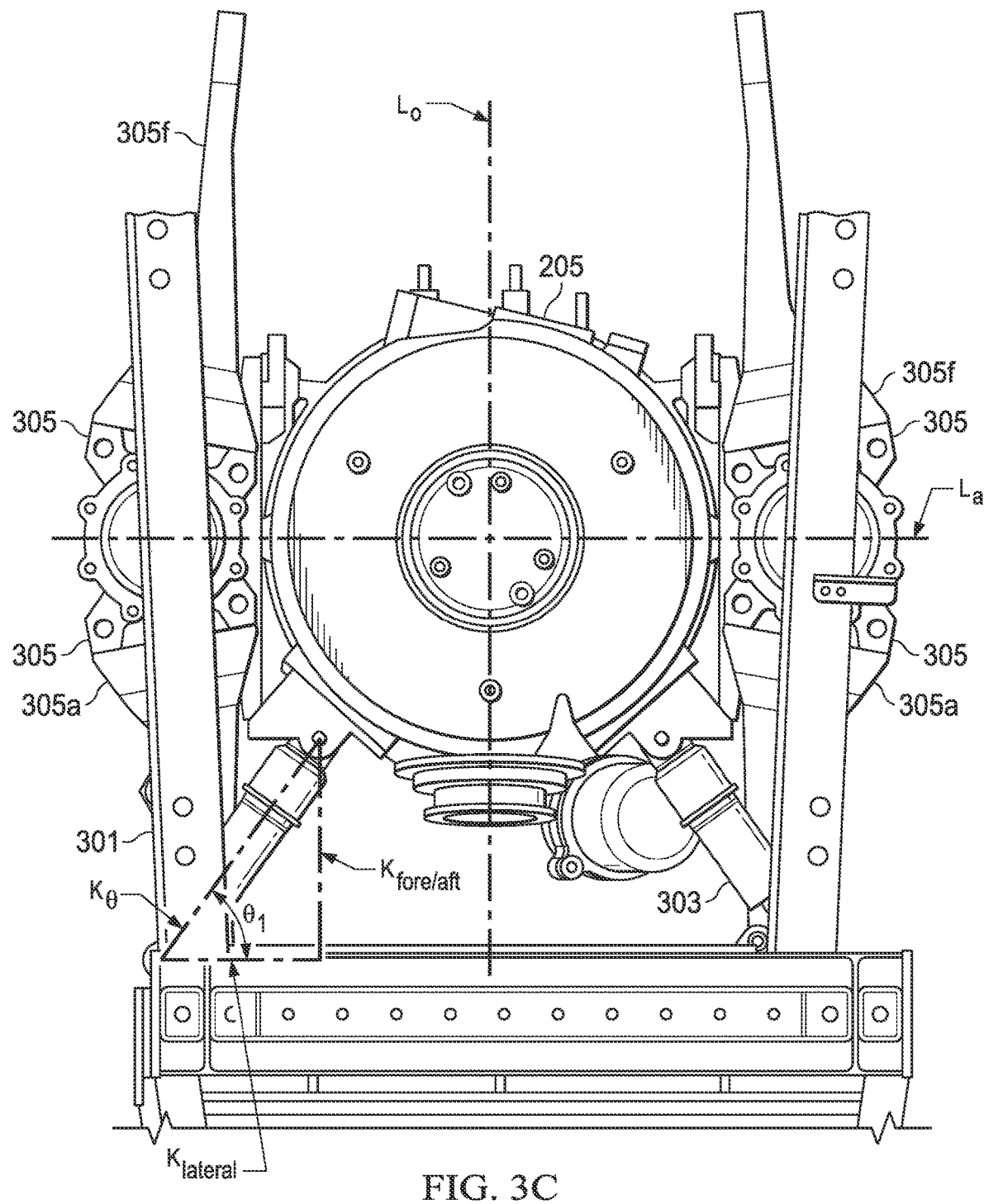

FIGS. 3A-3C illustrate an isometric view, a side view, and a bottom-up view, respectively, of a mounting of the main rotor transmission 205 to an airframe 301, in accordance with some embodiments. As illustrated in FIGS. 3A-3C, the main rotor transmission 205 may be mounted to the airframe 301 through restraints 303 and brackets 305.

The brackets 305 may include fore brackets 305$f$ and aft brackets 305$a$. The fore brackets 305$f$ are attached between the airframe 301 and portions of the main rotor transmission 205 disposed towards the front of the rotorcraft 101 and the aft brackets 305$a$ are attached between the airframe 301 and portions of the main rotor transmission 205 disposed towards the rear of the rotorcraft 101. The brackets 305 may include bearings (such as bearing 501, discussed below in reference to FIGS. 5A-5C) through which the brackets 305 are attached to the airframe 301. Mounting the brackets 305 to the airframe 301 using the bearings allows for movement of the main rotor transmission 205 in both the pitch and roll planes.

Centerlines of the fore brackets 305$f$ and the aft brackets 305$a$ may meet at a virtual focal point p, as illustrated in FIGS. 3A and 3B. The main rotor transmission 205 may rotate around the virtual focal point p in both the roll and pitch planes. The restraints 303 may be mounted to a point on the main rotor transmission 205 disposed a distance $d_1$ below the virtual focal point p. Increasing the distance $d_1$ between the virtual focal point p and the mounting point of the restraints 303 decreases the spring constant required for the restraints 303. The restraints 303 may further be mounted a distance $d_2$ above a bottom surface of the main rotor transmission 205. The distance $d_1$ may be from about 10.2 inches to about 12.5 inches and the distance $d_2$ may be from about 0.69 inches to about 0.85 inches. However, the positioning of the restraints 303 is restrained due to space constraints in the fuselage. As illustrated in FIG. 3B, the restraints 303 may be mounted near the bottom of the main rotor transmission 205; however, in other embodiments, the restraints 303 may be mounted to another portion of the main rotor transmission 205, such as the top of the main rotor transmission.

The restraints 303 may limit the motion of the main rotor transmission 205 during flight. For example, the restraints 303 may allow for some motion of the main rotor transmission 205 in the roll and pitch planes. This reduces vibration from being transferred from the main rotor transmission 205 to the airframe 301. However, the restraints 303 may include bumpers which restrict the maximum movement of the main rotor transmission 205, preventing damage to the main rotor transmission 205 and the rotorcraft components connected to the main rotor transmission 205 (e.g., the drive shafts, the engines, the mast 203, and the like) which may be caused by the main rotor transmission 205 moving too far. The bumpers included in the restraints 303 may restrict the maximum travel of the restraints 303 in any direction from ¼ inch to ½ inch, such that the total travel of the restraints 303 is from ½ inch to 1 inch. The restraints 303 may have a stiffness $K_\theta$ from about 6552 lbs/in to about 8008 lbs/in, such as about 7280 lbs/in. Various types of restraints may be used for the restraints 303, such as an elastomeric restraint, a pneumatic restraint, a hydraulic restraint, a spring-based restraint, a combination thereof, or any other type of restraint.

As illustrated in FIG. 3C, the restraints 303 may be disposed at a non-orthogonal angle to both a longitudinal axis $L_o$ of the rotorcraft 101 and a lateral axis $L_a$ of the rotorcraft 101 (e.g., at an angle between 0° and 90° to the longitudinal axis $L_o$ of the rotorcraft 101 and the lateral axis $L_a$ of the rotorcraft 101). Because the restraints 303 are disposed non-orthogonally to the longitudinal axis $L_o$ of the rotorcraft 101 and the lateral axis $L_a$ of the rotorcraft 101, the restraints 303 may provide stiffness and motion control in two directions (e.g., in the roll plane and the pitch plane). In various embodiments, the restraints 303 may be disposed at an angle $\theta_1$ to the lateral axis $L_a$ of the rotorcraft 101. The angle $\theta_1$ may be set based on dynamic and static stiffness requirements in both the roll plane and the pitch plane and may be from about 32° to about 40°. Based on the angle $\theta_1$, the stiffness $K_\theta$ of each of the restraints 303 may be broken down into a stiffness $K_{lateral}$ in the roll plane and a stiffness $K_{fore/aft}$ in the pitch plane. In various embodiments, the stiffness $K_{lateral}$ of the restraints 303 in the roll plane may be from about 5367 lbs/in to about 6559 lbs/in and the stiffness $K_{fore/aft}$ of the restraints 303 in the pitch plane may be from about 3758 lbs/in to about 4594 lbs/in.

Conventional rotorcraft designs use separate restraints which are aligned with the longitudinal axis $L_o$ of the rotorcraft 101 and the lateral axis $L_a$ of the rotorcraft 101 and each provide isolation in in only a single plane. In contrast, using the angled restraints 303 allows for each of the restraints to provide isolation in multiple planes. This allows for as little as two of the restraints 303 to be used to mount the main rotor transmission 205 to the airframe 301, whereas conventional rotorcraft use three or more restraints to mount the transmission. Use of the angled restraints 303 further allows for smaller lighter restraints to be used as opposed to embodiments wherein the restraints do not operate in an axial fashion. This saves cost, space, and weight in the rotorcraft 101 and simplifies the system used to mount the main rotor transmission 205.

Figure 4:
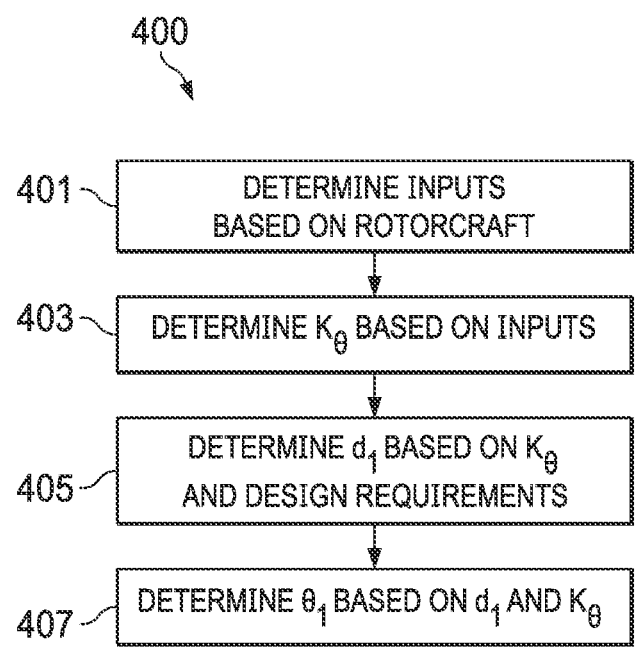
FIG. 4 illustrates a method which may be used to determine various parameters for restraints according to some embodiments.

FIG. 4 illustrates a method 400 which may be used to determine various parameters for the restraints 303, in accordance with some embodiments. In step 401 of the method 400, various inputs are determined based on the rotorcraft 101 in which the restraints 303 are to be mounted. The inputs may include the distance between the center of gravity (CG) of the main rotor hub 207 and the CG of the main pylon 201, the distance between the CG of the main pylon 201 and the CG of the fuselage 125, the distance between the CG of the main pylon 201 and the CG of the main rotor transmission 205, the distance between the CG of the fuselage 125 and the CG of the main rotor transmission 205, the main pylon 201 weight/inertia, the main rotor hub 207 weight/inertia, the fuselage 125 weight/inertia, the main rotor transmission 205 weight/inertia, the desired isolation frequency (e.g., N/rev, where N is the number of rotor blades included in the main rotor system 103), combinations thereof, or the like. The inputs may further include an angle between a line extending from the CG of the main rotor transmission 205 to the CG of the main pylon 201 and a line extending from the CG of the main rotor transmission 205 and the CG of the fuselage 125.

The main rotor system 103 may generate a sinusoidal rotor force such that the main rotor hub 207 and the main rotor transmission 205 (connected by the mast 203) oscillate about the virtual focal point p. The restraints 303 provide damping between this system and the fuselage 125. In step 403, a spring rate ($K_\theta$) to be used in the restraints 303 is determined based on the inputs. The spring rate $K_\theta$ may be selected by solving equations of motion for the system including the main rotor hub 207, the main rotor transmission 205, and the fuselage 125, with the system being treated as a harmonic oscillator. A value for the spring rate $K_\theta$ may be selected in order to provide optimal isolation between the main rotor transmission 205 and the airframe 301 of the rotorcraft 101.

In step 405, the distance $d_1$ is determined based on the spring rate $K_\theta$ and design requirements for the rotorcraft 101. The distance $d_1$, may be a height between the virtual focal point p of the brackets 305 and a mounting point of the restraints 303, as illustrated in FIG. 3B. The distance $d_1$ may be related to the spring rate $K_\theta$ by the equation $K_\theta = K_{fore/aft} * d_1^2$, wherein $K_{fore/aft}$ is the fore/aft component of the spring rate $K_\theta$. Increasing the distance $d_1$ may decrease the spring rate $K_\theta$ required, while decreasing the distance $d_1$ may increase the spring rate $K_\theta$ required. The distance $d_1$ may have a maximum value based on the amount of space available in the fuselage 125.

Finally, in step 407, the angle $\theta_1$ may be determined based on the distance $d_1$ and the spring rate $K_\theta$. The angle $\theta_1$ is the angle between the fuselage in the roll direction and the restraints 303, as illustrated in FIG. 3C. The angle $\theta_1$ is set to optimize the stiffness of the restraints 303 in the roll plane and the pitch plane. By mounting the restraints 303 at an angle to the fuselage 125, each of the restraints 303 may provide stiffness and isolation in both the roll plane and the pitch plane. For example, as illustrated in FIG. 3C, the restraints 303 provide stiffness $K_\theta$, which may be separated into stiffness $K_{lateral}$ in the roll plane and stiffness $K_{fore/aft}$ in the pitch plane. The angle $\theta_1$ may be related to the spring by the equation $K_{lateral} = K_\theta * \sin(\theta_1)$.

Figure 5A:
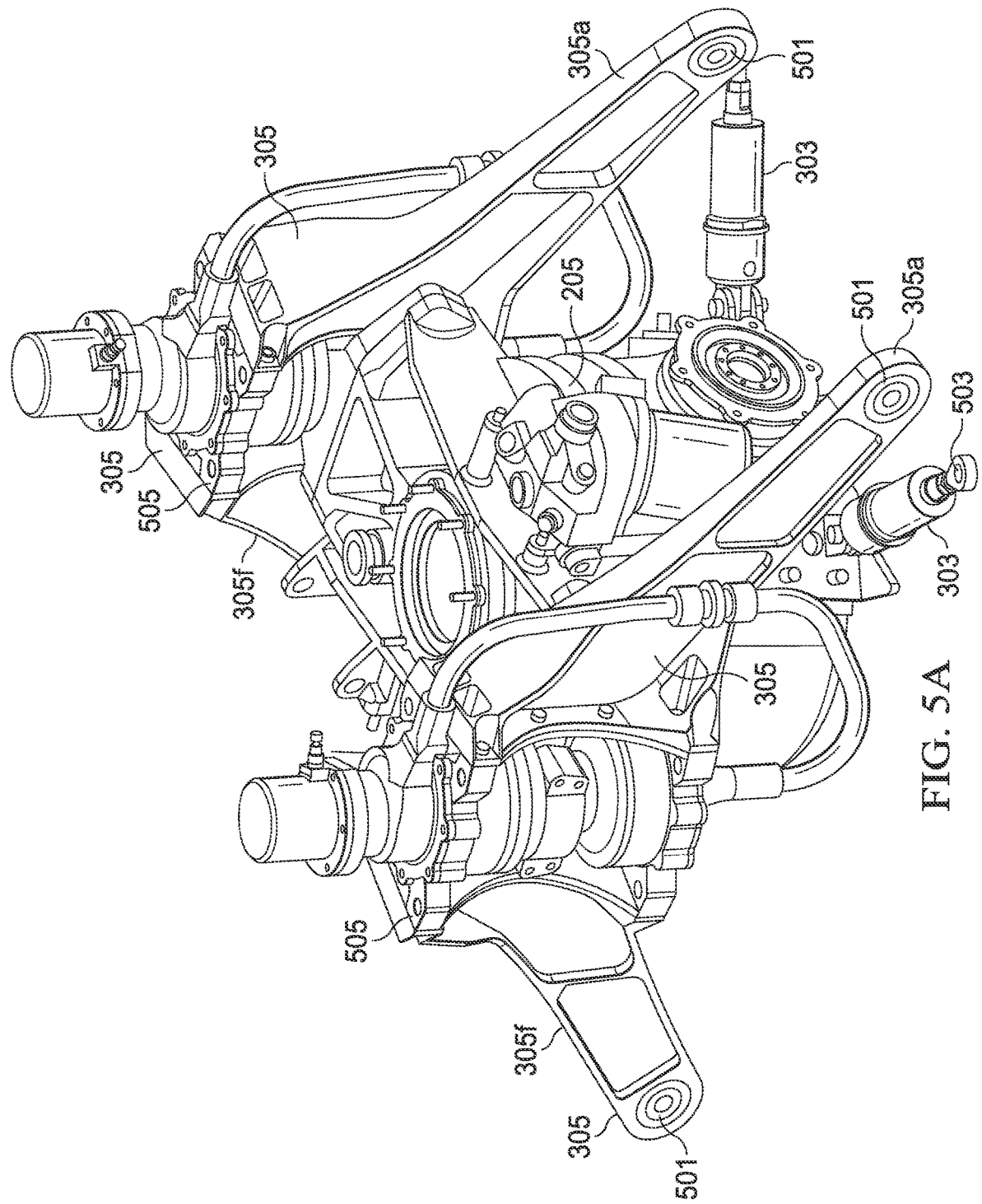
FIGS. 5A-5C illustrate an isometric view, a side view, and a bottom-up view, respectively, of a main rotor transmission, rigid mounts, and restraints according to some embodiments.
Figure 5B:
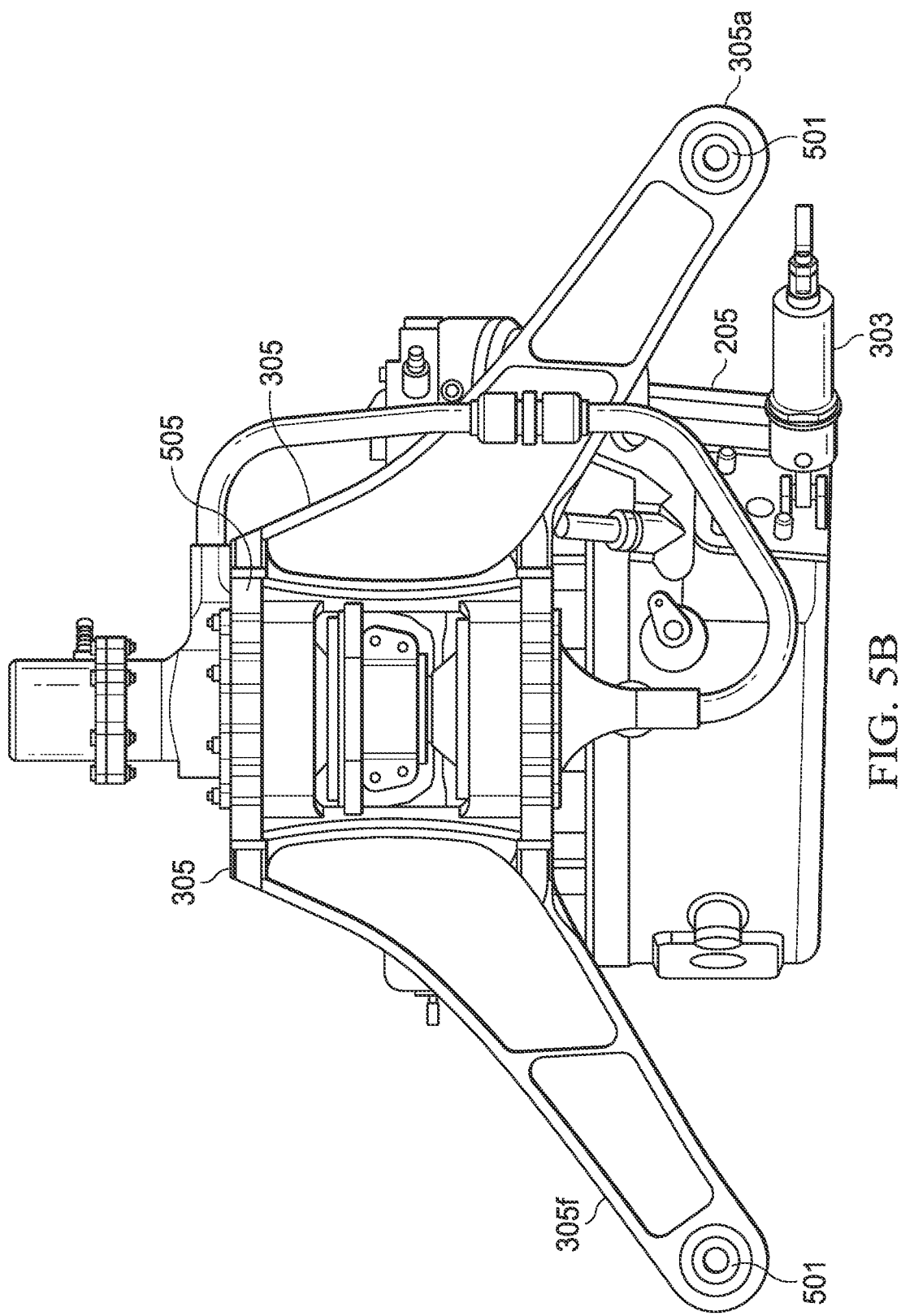
Figure 5C:
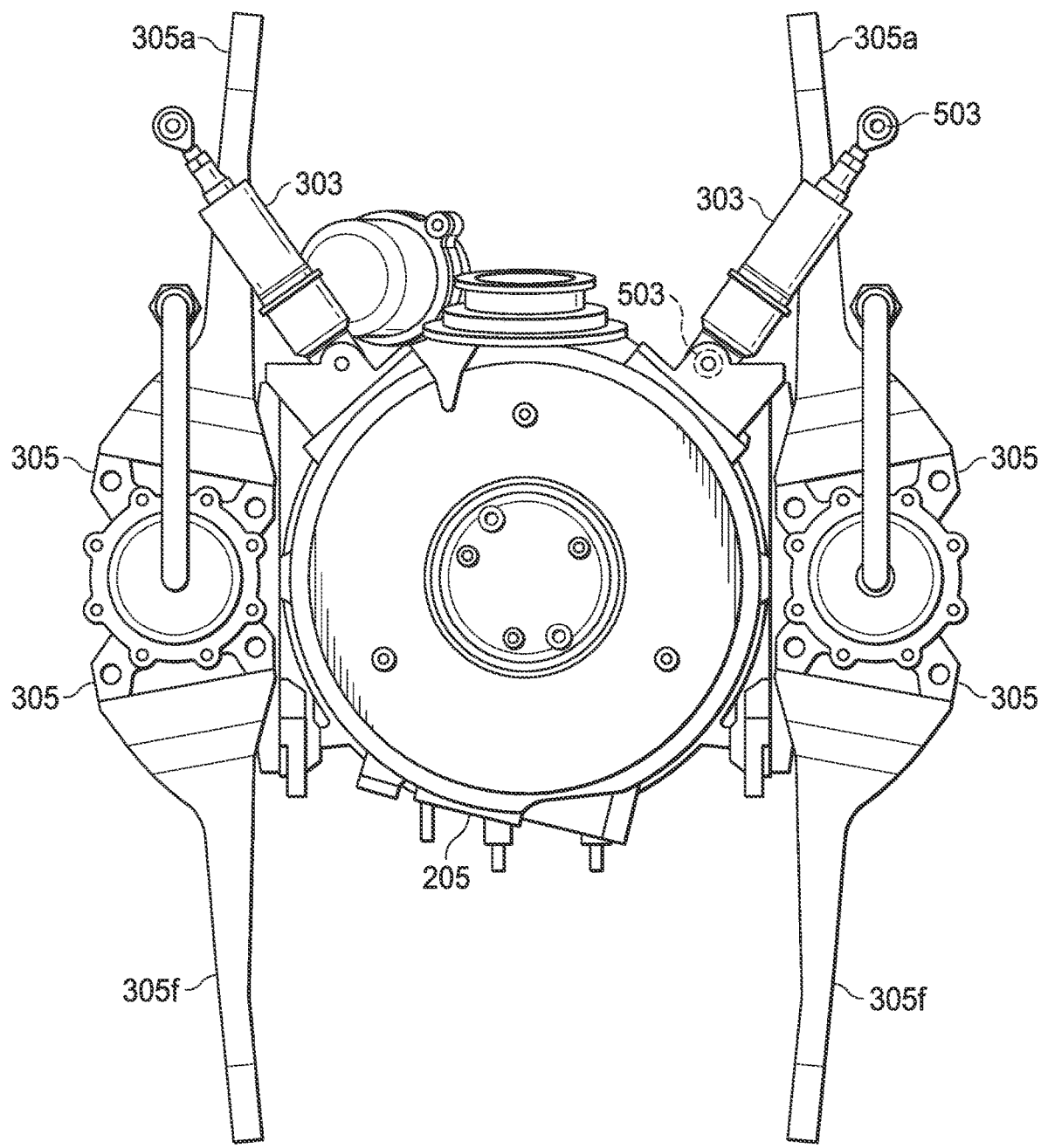
Figure 6A:
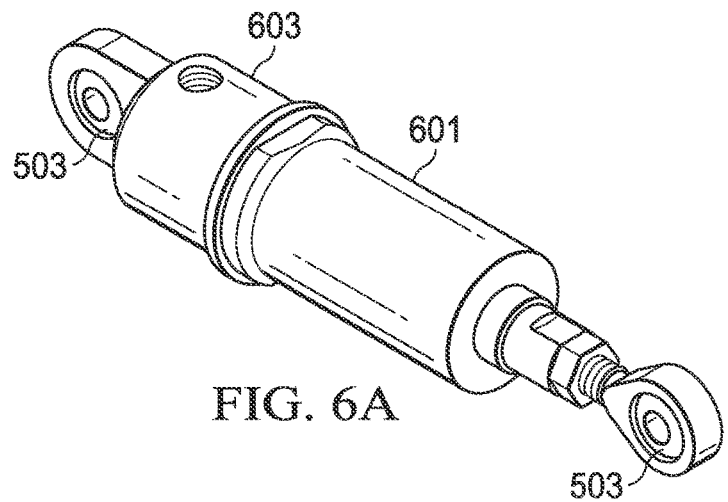
FIGS. 6A-6D illustrate an isometric view, a side view, a back-to-front view, and a bottom-up view, respectively, of a restraint according to some embodiments.
Figure 6B:
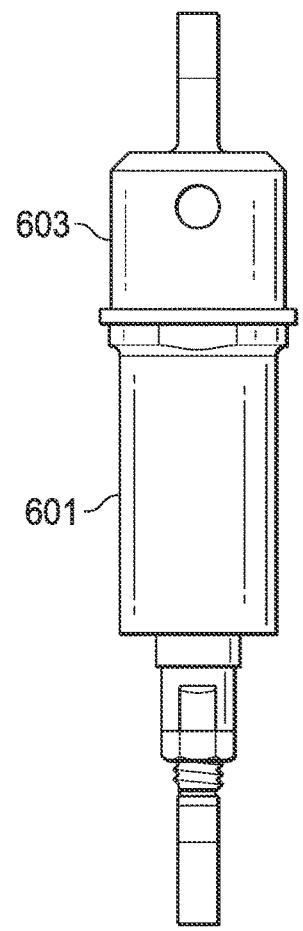
Figure 6C:
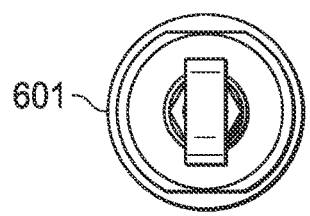
Figure 6D:
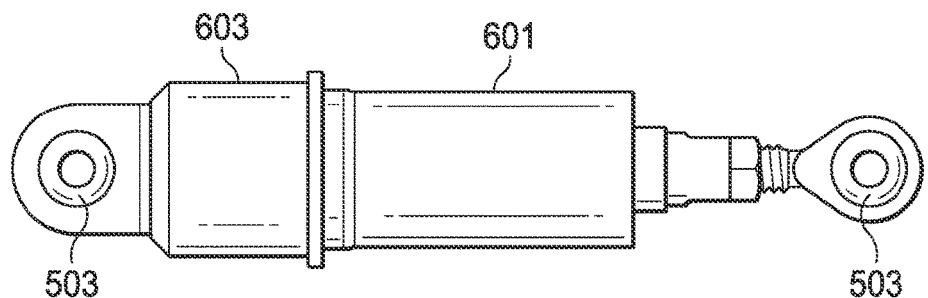

FIGS. 5A-5C illustrate an isometric view, a side view, and a bottom view, respectively, of the main rotor transmission 205, the brackets 305, and the restraints 303, in accordance with some embodiments. As illustrated in FIGS. 5A and 5B, the brackets 305 include bearings 501. The bearings 501 allow the main rotor transmission 205 to have some freedom of motion in the roll and pitch planes. The brackets 305 may be mounted to the airframe 301 using bolts which pass through the bearings 501. Moreover, as illustrated in FIGS. 5A and 5C, the restraints 303 include bearings 503, which allow the restrains 303 some freedom of motion when compensating for the vibration in the main rotor transmission 205. In various embodiments, the bearings 503 may be spherical bearings. The bearings 501 and the bearings 503 may be rubber bearings, which may provide additional degrees of freedom for movement of the main rotor transmission 205.

The brackets 305 include fore brackets 305f and aft brackets 305a. The fore brackets 305f extend towards the front of the rotorcraft 101, while the aft brackets 305a extend towards the rear of the rotorcraft 101 in a direction opposite the fore brackets 305f. Longitudinal axes of the fore brackets 305f and the aft brackets 305a may be substantially parallel to a longitudinal axis of the rotorcraft 101. The fore brackets 305f and the aft brackets 305a may be bolted to mounts 505 on either side of the main rotor transmission 205.

As illustrated in FIG. 5C, the restraints 303 may be attached to the same side of the main rotor transmission 205 as the brackets 305 and may extend in a direction toward the rear of the rotorcraft 101 and away from the longitudinal axis of the rotorcraft 101. The restraints 303 may be attached to the main rotor transmission 205 inside (e.g., closer to the longitudinal axis of the rotorcraft 101) the brackets 305 and extend outside (e.g., further from the longitudinal axis of the rotorcraft 101) of the brackets 305. Longitudinal axes of the restraints 303 may be substantially aligned with a centerline of the main rotor transmission 205. The restraints 303 may have lengths shorter than lengths of the brackets 305.

FIGS. 6A-6D illustrate an isometric view, a side view, a back-to-front view, and a bottom-up view, respectively, of one of the restraints 303, in accordance with some embodiments. As illustrated in FIGS. 6A-6D, the restraints 303 include an inner casing 601 and an outer casing 603. One of the bearings 503 may be mounted at opposite ends of the inner casing 601 and the outer casing 603. The inner casing 601 and the outer casing 603 are concentric tubes with the inner casing 601 fitting inside the outer casing 603. The inner casing 601 and the outer casing 603 may be formed of metal. In embodiments in which the restraints 303 comprise elastomeric restraint, an elastomeric material may be injection molded into a cavity within the inner casing 601 and the outer casing 603. In response to a load being applied to the restraints 303, the inner casing 601 may move into or out from the outer casing 603.

As discussed previously, mounting the main rotor transmission 205 to the airframe 301 using the restraints 303 which are disposed non-orthogonally with the airframe 301 enables the restraints 303 to provide stiffness in two planes (e.g., the roll plane and the pitch plane). This allows for vibration from the main rotor transmission 205 to be isolated from the airframe 301 with less restraints compared to conventional practices, which reduces cost and weight and also saves space in the fuselage.

In accordance with an embodiment, a rotorcraft includes an airframe; a main rotor transmission; one or more brackets mounting the main rotor transmission to the airframe, longitudinal axes of the one or more brackets being substantially parallel with a longitudinal axis of the rotorcraft; and one or more restraints mounting the main rotor transmission to the airframe, the one or more restraints being mounted at an angle non-orthogonal to the longitudinal axis of the rotorcraft and a lateral axis of the rotorcraft. In an embodiment, the one or more restraints are mounted to the airframe at an angle from 32° to 40° to the lateral axis of the rotorcraft. In an embodiment, the one or more restraints have a stiffness from 6552 lbs/in to 8008 lbs/in. In an embodiment, each of the one or more brackets is attached to the airframe through a spherical bearing. In an embodiment, the one or more restraints have a total travel from ½ inch to 1 inch. In an embodiment, a height between a central axis of the one or more restraints and a bottom surface of the main rotor transmission is from 0.69 inches to 0.85 inches. In an embodiment, the one or more restraints provide a stiffness in a roll plane less than a stiffness in a pitch plane. In an embodiment, the one or more restraints include two restraints, and the one or more restraints provide stiffness in a roll plane and a pitch plane.

In accordance with another embodiment, a system includes a rotor hub; a plurality of rotor blades attached to the rotor hub; a transmission coupled to the rotor hub; and a transmission mounting assembly for mounting the transmission to an airframe, the transmission mounting assembly including one or more brackets; and one or more restraints, the one or more restraints being mounted to the transmission and the airframe at an angle between 0° and 90° with a lateral axis of the airframe. In an embodiment, the one or more restraints include one or more elastomeric restraints. In an embodiment, each restraint of the one or more restraints has a travel from ¼ inch to ½ inch in a direction parallel to a longitudinal axis of the airframe and a travel from ¼ inch to ½ inch in a direction parallel to the lateral axis of the airframe. In an embodiment, the angle is from 32° to 40°. In an embodiment, the transmission mounting assembly includes four brackets and two restraints. In an embodiment, a longitudinal axis of a first bracket and a longitudinal axis of a second bracket of the one or more brackets meet at a virtual focal point, and a first restraint of the one or more restraints is mounted to the transmission at a point from 10.2 inches to 12.5 inches below the virtual focal point.

In accordance with yet another embodiment, a method for determining parameters for a transmission restraint in a rotorcraft includes determining a plurality of inputs for a main rotor system, the main rotor system including a rotorcraft fuselage, a rotorcraft transmission, and a rotorcraft hub; solving equations of motion for the main rotor system to determine a spring rate for a restraint used to attach the rotorcraft transmission to the rotorcraft fuselage; calculating a distance between an attachment point of the restraint on the rotorcraft transmission and a virtual focal point of two brackets used to attach the rotorcraft transmission to the rotorcraft fuselage based on the spring rate; and calculating an angle of restraint between the restraint and the rotorcraft fuselage based on the spring rate and the distance, the angle of restraint being between 0° and 90°. In an embodiment, the spring rate is from 6552 lbs/in to 8008 lbs/in. In an embodiment, the distance is from 10.2 inches to 12.5 inches. In an embodiment, the angle of restraint is from 32° to 40°. In an embodiment, the plurality of inputs include a distance from a center of gravity of the hub to a center of gravity of the pylon, a distance from the center of gravity of the pylon to a center of gravity of the fuselage, a weight of the hub, a weight of the pylon, and a weight of the fuselage. In an embodiment, the restraint has a stiffness in a roll plane of the rotorcraft from 5367 lbs/in to 6559 lbs/in and a stiffness in a pitch plane of the rotorcraft from 3758 lbs/in to 4594 lbs/in.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for determining parameters for a transmission restraint in a rotorcraft, the method comprising:
    determining a plurality of inputs for a main rotor system, the main rotor system including a rotorcraft fuselage, a rotorcraft transmission, and a main rotor hub;
    determining, according to the inputs, and by treating the main rotor system as a harmonic oscillator, a spring rate for a restraint for attaching the rotorcraft transmission to the rotorcraft fuselage;
    calculating, according to the spring rate, a distance between an attachment point of the restraint on the rotorcraft transmission and a virtual focal point of the rotorcraft transmission, wherein two brackets attach the rotorcraft transmission to the rotorcraft fuselage such that the rotorcraft transmission is arranged to oscillate around the virtual focal point; and
    calculating an angle of restraint between the restraint and the rotorcraft fuselage based on the spring rate and the distance, wherein the angle of restraint is between 0° and 90°, and wherein the restraint is mounted to the rotorcraft transmission at a point below the virtual focal point.

2. The method of claim 1, wherein the spring rate is from 6552 lbs/in to 8008 lbs/in.

3. The method of claim 1, wherein the distance is from 10.2 inches to 12.5 inches.

4. The method of claim 1, wherein the angle of restraint is from 32° to 40°.

5. The method of claim 1, wherein the plurality of inputs comprise a distance from a center of gravity of the main rotor hub to a center of gravity of a pylon of the main rotor system, a distance from the center of gravity of the pylon to a center of gravity of the rotorcraft fuselage, a weight of the main rotor hub, a weight of the pylon, and a weight of the rotorcraft fuselage.

6. The method of claim 1, wherein the restraint has a stiffness in a roll plane of the rotorcraft from 5367 lbs/in to 6559 lbs/in and a stiffness in a pitch plane of the rotorcraft from 3758 lbs/in to 4594 lbs/in.

7. A method for providing a rotorcraft system, the method comprising:
    determining a plurality of inputs for a main rotor system of the rotorcraft system, the main rotor system including a rotorcraft fuselage, a main rotor transmission, and a rotorcraft hub;
    determining, using the inputs, a spring rate for each restraint of one or more restraints configured to attach the main rotor transmission to the rotorcraft fuselage;
    connecting the main rotor transmission to an airframe with one or more brackets, wherein the one or more brackets extend away from the transmission to connect to the airframe; and
    connecting the main rotor transmission to the airframe with the one or more restraints, wherein each distance between an attachment point of each restraint at the main rotor transmission and a virtual focal point of the main rotor transmission is associated with the spring rate, wherein the virtual focal point is a point around which the rotorcraft hub and main rotor transmission oscillate, and wherein the one or more restraints are mounted at an angle that is non-orthogonal to a longitudinal axis of the rotorcraft system and a lateral axis of the rotorcraft system, wherein an angle of restraint between each restraint of the one or more restraints and a lateral axis the rotorcraft fuselage is associated with the spring rate and the distance, and is between 0° and 90°, and wherein each restraint of the one or more restraints is mounted to the main rotor transmission at a point below the virtual focal point.

8. The method of claim 7, wherein the one or more restraints are mounted to the airframe at an angle from 32° to 40° to the lateral axis of the rotorcraft.

9. The method of claim 7, wherein the one or more restraints have a stiffness from 6552 lbs/in to 8008 lbs/in.

10. The method of claim 7, wherein each of the one or more brackets is attached to the airframe by a spherical bearing.

11. The method of claim 7, wherein the one or more restraints have a total travel from ½ inch to 1 inch.

12. The method of claim 7, wherein a height between a central axis of the one or more restraints and a bottom surface of the main rotor transmission is from 0.69 inches to 0.85 inches.

13. The method of claim 7, wherein the one or more restraints comprise two restraints, and wherein the one or more restraints provide stiffness in a roll plane and a pitch plane.

14. A method for providing a rotorcraft system, the method comprising:
    providing a transmission configured to be coupled to a rotor hub that is configured to have one or more rotor blades attached thereto; and
    providing a transmission mounting assembly for mounting the transmission to an airframe, the providing the transmission mounting assembly comprising:
    connecting a main rotor transmission to the airframe with one or more brackets, wherein the one or more brackets extend away from the main rotor transmission to connect to the airframe such that the main rotor transmission is arranged to oscillate around a virtual focal point of the main rotor transmission; and
    connecting the main rotor transmission to the airframe with one or more restraints, wherein each distance between an attachment point of each restraint of the one or more restraints at the main rotor transmission and the virtual focal point of the main rotor transmission is associated with a spring rate for each of the restraints, wherein the spring rate for each of restraint or the one or more restraints is associated with inputs for a main rotor system of the rotorcraft system by treating one or more of the inputs as portions of a harmonic oscillator, and wherein the one or more restraints are mounted at an angle that is non-orthogonal to a longitudinal axis of a rotorcraft and a lateral axis of the rotorcraft, wherein an angle of restraint between each restraint of the one or more restraints and a lateral axis of the airframe is associated with the spring rate and the distance, and is between 0° and 90°, and wherein each restraint of the one or more restraints is mounted to the main rotor transmission at a point below the virtual focal point.

15. The method of claim 14, wherein each restraint of the one or more restraints has a travel from ¼ inch to ½ inch in a direction parallel to a longitudinal axis of the airframe and a travel from ¼ inch to ½ inch in a direction parallel to the lateral axis of the airframe.

16. The method of claim 14, wherein the angle is from 32° to 40°.

17. The method of claim 14, wherein a longitudinal axis of a first bracket and a longitudinal axis of a second bracket of the one or more brackets meet at the virtual focal point, and wherein a first restraint of the one or more restraints is mounted to the transmission at a point from 10.2 inches to 12.5 inches below the virtual focal point.

* * * * *